US007549166B2

(12) United States Patent
Baffes et al.

(10) Patent No.: US 7,549,166 B2
(45) Date of Patent: Jun. 16, 2009

(54) DEFENSE MECHANISM FOR SERVER FARM

(75) Inventors: Paul T. Baffes, Austin, TX (US); John Michael Garrison, Austin, TX (US); Michael Gilfix, Austin, TX (US); Allan Hsu, Centerville, OH (US); Tyron Jerrod Stading, Austin, TX (US); Ronald S. Woan, Austin, TX (US); John D. Wolpert, Austin, TX (US); Shawn L. Young, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 618 days.

(21) Appl. No.: 10/313,728

(22) Filed: Dec. 5, 2002

(65) Prior Publication Data

US 2004/0111636 A1    Jun. 10, 2004

(51) Int. Cl.
*G06F 11/00* (2006.01)
*G06F 7/04* (2006.01)
(52) U.S. Cl. .............................. 726/23; 726/24; 726/27
(58) Field of Classification Search ................ 713/189; 726/24, 23, 26
See application file for complete search history.

(56) References Cited

U.S. PATENT DOCUMENTS

| | | | |
|---|---|---|---|
| 5,935,246 A | | 8/1999 | Benson |
| 5,940,516 A | | 8/1999 | Mason et al. |
| 5,953,502 A | * | 9/1999 | Helbig, Sr. .................. 726/24 |
| 6,047,242 A | | 4/2000 | Benson |
| 6,708,212 B2 | * | 3/2004 | Porras et al. ................ 709/224 |
| 6,775,657 B1 | * | 8/2004 | Baker .......................... 706/45 |
| 6,950,946 B1 | * | 9/2005 | Droz et al. ................. 340/5.74 |
| 7,010,698 B2 | * | 3/2006 | Sheymov .................... 713/194 |
| 7,042,852 B2 | * | 5/2006 | Hrastar ....................... 370/310 |
| 7,076,801 B2 | * | 7/2006 | Gong et al. .................... 726/11 |
| 2001/0014945 A1 | * | 8/2001 | Muschenborn .............. 713/201 |
| 2002/0046109 A1 | * | 4/2002 | Leonard et al. ............... 705/14 |
| 2002/0046351 A1 | * | 4/2002 | Takemori et al. ............ 713/201 |
| 2002/0095607 A1 | * | 7/2002 | Lin-Hendel ................. 713/201 |
| 2002/0194489 A1 | * | 12/2002 | Almogy et al. ............. 713/200 |

OTHER PUBLICATIONS

An Introduction to the Back Orifice 2000 Backdoor Program; Back Office 2000 (BO2K), FirstSearch Copyright 1992-2000; FirstSearch@oclc.org; Auerbach Publications; Dec. 1999; USA.
Sushil Jajodia, Peng Liu, & Catherine D. McCollum; Application-Level Isolation to Cope With Malicious Database Users; The MITRE Corporation;Center for Secure Information Systems and Dept. of Information and Software Engineering; George Mason University;1998; USA.

* cited by examiner

*Primary Examiner*—Nasser G Moazzami
*Assistant Examiner*—Mohammad W Reza
(74) *Attorney, Agent, or Firm*—Dillon & Yudell LLP

(57) ABSTRACT

A method and system for handling a malicious intrusion to a machine in a networked group of computers. The malicious intrusion is an unauthorized access to the machine, such as a server in a server farm. When the intrusion is detected, the machine is isolated from the rest of the server farm, and the machine is reprovisioned as a decoy system having access to only data that is ersatz or at least non-sensitive. If the intrusion is determined to be non-malicious, then the machine is functionally reconnected to the server farm, and the machine is reprovisioned to a state held before the reprovisioning of the machine as a decoy machine.

17 Claims, 4 Drawing Sheets

DEFENSE MECHANISM FOR SERVER FARM

BACKGROUND OF THE INVENTION

1. Technical Field

The present invention relates in general to the field of data processing, and, in particular, to an improved data processing system and method for protecting a server farm from a malicious intrusion.

2. Description of the Related Art

Server farms are service providing entities consisting of clusters of data processing systems, often referred to as "machines." Each machine typically has identical software and hardware configurations, and thus the machines are often referred to as "clones." Customer service requests are distributed across the machines in a "machine pool," thus distributing the request load across the machine pool.

Server farms are often used to provide mission sensitive services for high-end enterprise businesses where security of information and system integrity is of utmost concern. However, server farms are inherently insecure, since all machines in the server farm share the exact same configuration, thus making them susceptible to the same attack. That is, since the machines are identical, they each have the same vulnerability that makes each machine able to be compromised by an intrusion software, such as a hacking program or a virus. Thus, once one machine in a farm is compromised, then all other machines in the farm can quickly be compromised.

There are many forms of intrusion software. However, most follow seven basic steps after accessing the server farm through an unsecured port, typically an Internet Protocol (IP) port connection.

First, the server farm is scanned to identify any operating systems (OSs) and/or applications are running. This allows the intrusion software to be configured to attack known vulnerabilities of the operating OSs and other programs.

Second, the intrusion software enumerates the server farm. This enumeration includes learning the network topology, including details of the hardware configuration of the machines and their peripherals as well as how the machines interface with one another as well as outside the machine farm. Enumeration also includes learning what users/groups use the server farm, and what the overall purpose of the server farm is.

Third, the intrusion software penetrates the security of the server farm. That is, with the information obtained in the first two steps, the intrusion software capture passwords by guessing, sniffing and cracking, including both user as well as administrator passwords. As the terms suggest, "guessing" involves random attempts using common passwords (current date, common names, etc.), "sniffing" involves monitoring software traffic and capturing passwords in headers, and "cracking" involves deciphering passwords using various decryption techniques.

Fourth, the intrusion software escalates the attack by attacking the operating system and named pathways using the access provided by the stolen passwords obtained in step three. Control of the system is seized by the intrusion software, allowing the intrusion software to perform mischief.

Fifth, the intrusion software, now having control of the operating system and associated applications and pathways, begins to pillage the server farm. This pillaging includes taking whatever the intrusion software desires subject to its ability. Pillaging includes obtaining deeper level security information such as system decryption keys, registry keys, finding deeper hidden passwords, auditing all available files, such as payroll information and other proprietary information, vandalizing logs, distributing denial of service, etc.

Sixth, the intrusion software becomes interactive, seizing control of remote interfaces and shells, giving the intrusion software the ability to further intrude on and/or corrupt other remotely connected systems.

Seventh, the intrusion software expands its influence using the interactive ability developed in step six, but spreading viruses, auditing other secure networks/server farms, etc.

The usual response to isolate an intrusion is to isolate the attack as much as possible. The system administrator reconfigures a firewall to block future messages originating from the attacker's Internet Protocol (IP) address, thus preventing future attacks from that address. The attacked machine is assumed to be compromised, and thus is isolated, since a single compromised (hacked) machine can have disastrous consequences, as the security breach of the single machine can bring down the entire server farm if not dealt with.

To isolate the compromised machine and avoid bringing down the entire server farm, the compromised machine is communicatively disconnected from both other machines in the server farm as well as outside networks by disabling the compromised machine's IP address. However, this approach alerts the hacker that the malicious intrusion has been detected, and any attempt to capture the hacker by keeping him on line and learning more about him (such as his originating IP address) is thwarted by the hacker's likely disconnection of the session with the compromised machine. Further, the hacker usually has other IP addresses for the server farm at his disposal, and simply will hack into the server farm using the IP address for one of the other machines in the server farm.

Another response known in the prior art for fighting intrusions involves the use of a "honeypot." A honeypot is a server that contains data, which is typically false, that is designed to attract the attention of the person or program that initiated the intrusion such data may include an ersatz list of passwords, payroll information, security protocols, trade secrets and other information that would be attractive to a hacker. However, honeypots used in the prior art have two main disadvantages. First, honeypots used in the prior art are dedicated servers that are isolated from a server farm. That is, the honeypot never processes real work, since the real work could be detected and compromised by the intrusion. Thus, the honeypot server is non-productive while waiting for an intrusion to occur, which might never happen. If an intrusion is never detected, then resources are wasted by buying and maintaining the honeypot. Second, most honeypots are designed to not only handle an intrusion directly, but to receive an intrusion that has been received by a non-honeypot machine in the server farm. When such a hand-off to the honeypot occurs, the hacker is able to detect the re-routing of the intrusion, thus tipping him off that the new server is likely a honeypot.

Therefore, there is a need for a method and system for handling an intrusion to a server farm without requiring the use of a full-time dedicated server for receiving the intrusion, either directly or indirectly. Preferably, the method and system does not alert the hacker that the intrusion has been detected, or that the server being hacked contains anything by real and valuable data.

SUMMARY OF THE INVENTION

The present invention is directed to a method and system for handling a malicious intrusion to a machine in a group of computers. The malicious intrusion is an unauthorized access to the machine, such as a server in a server farm. When the intrusion is detected, the machine is isolated from the rest of the server farm, and the machine is reprovisioned as a decoy system having access to only data that is ersatz or at least non-sensitive. If the intrusion is determined to be non-malicious, then the machine is functionally reconnected to the server farm, and the machine is reprovisioned to a state held before the reprovisioning of the machine as a decoy machine.

The above, as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
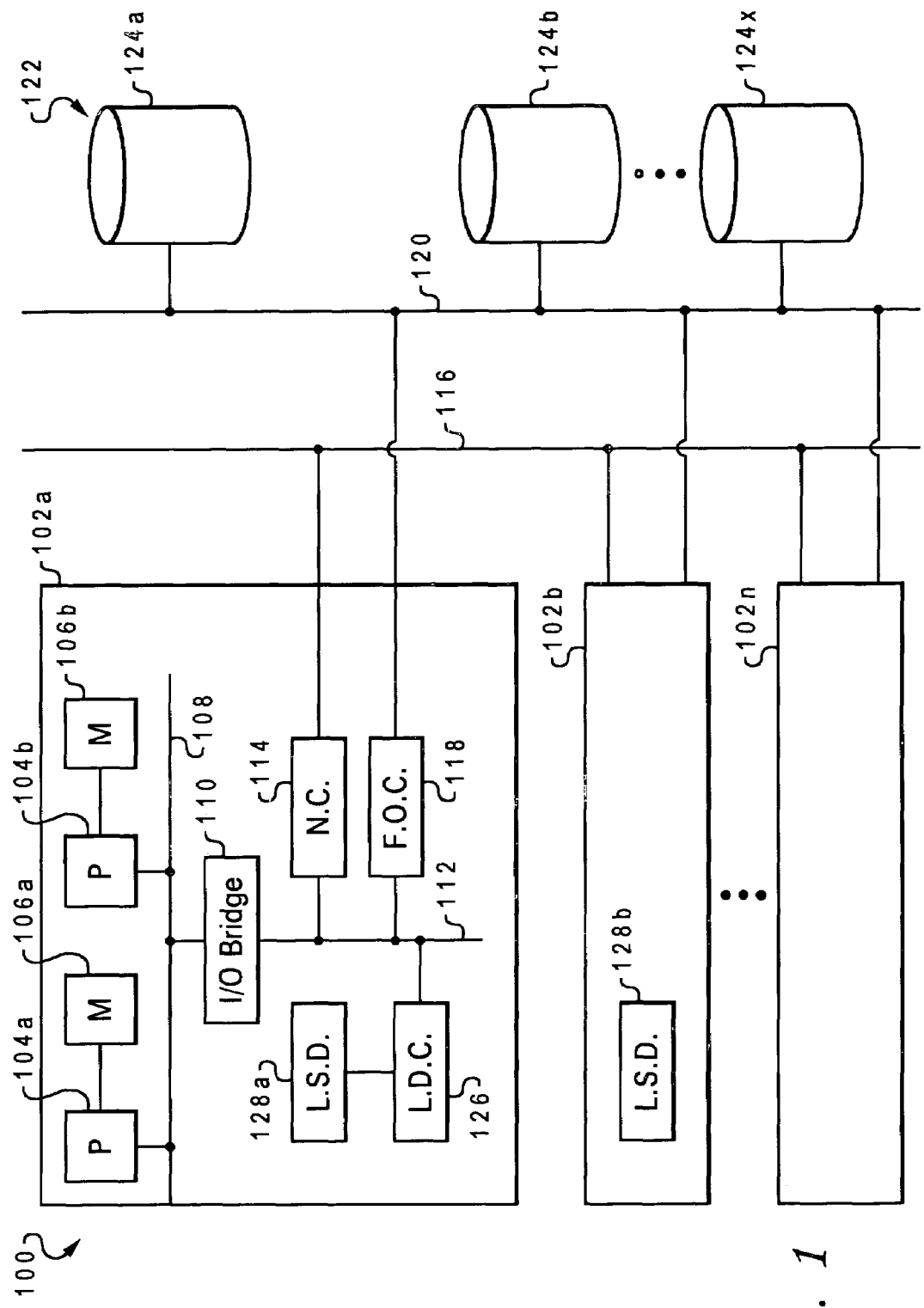
FIG. 1 depicts a block diagram of a there is depicted a block diagram of a server farm used in accordance with an exemplary embodiment of present invention.

With reference now to FIG. 1, there is depicted a block diagram of a server farm 100 used in accordance with the present invention. Server farm 100 comprises multiple machines 102, which are servers that make up server farm 100. Preferably, each machine 102 is a clone of every other machine 102 in the server farm 100. That is, machine 102a, 102b, and 102n each are configured with the same hardware and software.

Each machine 102 includes at least one processor 104. In the preferred embodiment depicted, each machine 102 is a multiprocessor (MP) machine, depicted in FIG. 1 as a symmetric multiprocessor machine (SMP) having at least two processors 104, depicted as processor 104a and processor 104b. Each processor 104 has an associated dedicated memory 106, which comprises a system memory and a cache memory hierarchy (not shown). As depicted, processor 104a is associated with memory 106a and processor 104b is associated with memory 106b.

Processors 104 are connected via SMP system bus 108 to an Input/Output (I/O) bridge 110, which is connected to a mezzanine bus 112. Connected to mezzanine bus 112 is a network channel controller 114, which connects processors 102 via network 116. That is, processor 102a is connected to processors 102b through 102n in server farm 100 via network 116. Preferably, network 116 is an Ethernet or similar network system known to those skilled in the art of computer networks.

Also connected to mezzanine bus 112 is a fiber optic controller 118, which permits data communication between processor 102 and a storage area network (SAN) 122 via fiber optic network 120. Preferably, fiber optic network 120 is a synchronous optical network (SONET) or similar physical layer network technology designed to carry large volumes of traffic over relatively long distances on fiber optic cabling as known to those skilled in the art of fiber optic networks. SAN 122 is preferably a high-speed subnetwork of shared SAN storage drives 124a through 124x. Each SAN storage drive 124 is available to any machine 102, such that the SAN storage drives 124 are synchronously connected to each other and asynchronously connected to the machines 102 in server farm 100.

Within each machine 102, a local drive controller 126 connects mezzanine bus 112 to a local storage drive 128. Local storage drive 128 may be a hard drive, a floppy drive, an optic drive or any other local drive system known to those skilled in the art of secondary storage devices.

Network channel controller 114 allows an interchange of data in local storage drives 128 between machines 102. That is, processor 102a can access data stored in a local storage drive 128b in machine 102b, and likewise processor 102b can access data stored in local storage drive 128a in machine 102a. Thus, any processor 102 can access data from any SAN storage drive 124 and any local storage drive 128.

Figure 2A:
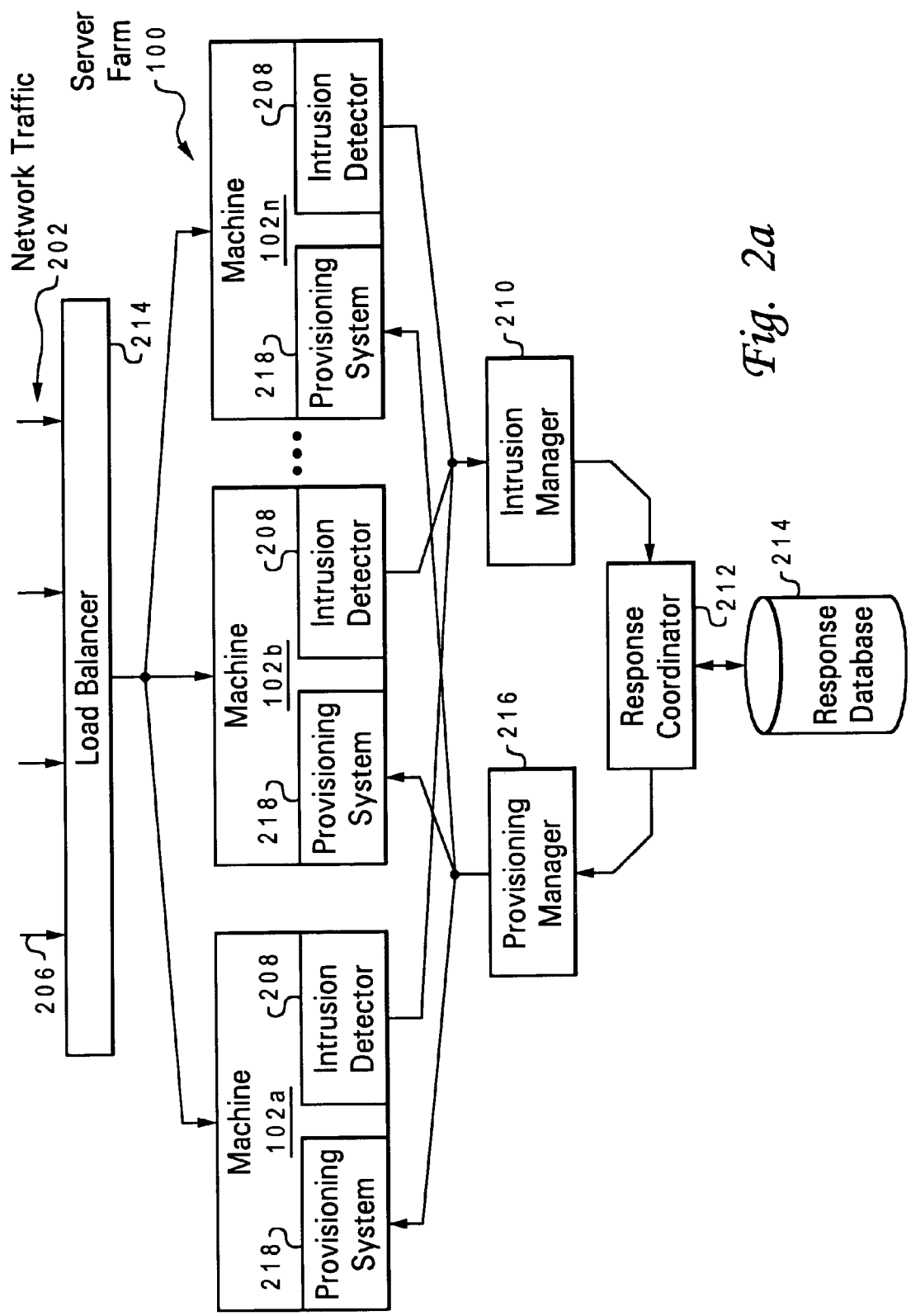
FIGS. 2a-b illustrate software implemented in accordance with the present invention's preferred mode.

With reference now to FIG. 2a, there is depicted a schematic representation of software implemented in accordance with the present invention's preferred mode. Network traffic 202 from an outside source, such as the Internet (not shown), is received by a load balancer 214. Included in the network traffic 202 may be intrusion 206, which is a software packet that is not authorized entry into server farm 100. If the intrusion 206 is designed to perform mischief, then intrusion 206 is called a malicious intrusion. One example of malicious intrusion is stealing data, such as trade secrets, passwords, security codes, administrator information, etc. Another example of a malicious intrusion is a worm, virus or trojan designed to damage the operation of the server farm 100. A virus depends on a means other than itself to propagate. For example, a virus may attach to an e-mail, and propagates when the e-mail is forwarded on to another system. Worms are similar to viruses, except that they can propagate without the aid of another program.

A trojan (Trojan horse) is a malicious intrusion that infects the system, and then does no damage by itself. However, once in the system, it opens a "back door" into the system to allow other malicious intrusions such as viruses or worms into the system. Trojans are often linked to distributed denial of service (DDOS) attacks, which flood load balancer 214 with packets to use up finites resources of server farm 100 so that legitimate network traffic cannot access server farm 100.

Another type of malicious intrusion is a scanner, which scans and mines unauthorized data from the system. Additional details of such unauthorized data are described below in the discussion of honeypots.

Referring again to FIG. 2a, after intrusion 206 is received by load balancer 214, intrusion 206 is sent to one of the machines 102 in server farm 100. Which machine 102 is chosen to receive intrusion 206, which still is perceived as a normal packet of network traffic by load balancer 214, is based on load requirements of machines 102, such as which machine 102 is free to handle the packet. When intrusion 206 is received by one of the machines 102, it is first screened by an intrusion detector 208, which is associated with each machine 102.

Intrusion detector 208 may be any network intrusion detection system known to those skilled in the art of network security. Such an intrusion detection system typically matches rules with an incoming packet. For example, a packet that has the instruction to scan all machines 102 in the server farm 100 for the machines' IP addresses may be suspicious enough for the intrusion detector 208 to identify the packet as a potentially malicious intrusion. Similarly, packets containing IP source addresses of known hackers, or code containing known virus strands, are identified by intrusion detector 208 as certain malicious intrusions.

Once intrusion 206 is identified as being an intrusion, intrusion manager 210 notifies response coordinator 212 of the intrusion, preferably with a suggested course of response. Response coordinator 212 instructs provisioning manager 216 to reprovision with data from response database 214 the machine 102 that received the intrusion 206. This reprovisioning is performed utilizing a provisioning system 218, associated with the machine 102 that received the intrusion 206, that is preferably under the control of provisioning manager 216.

For example, assume that machine 102b received the intrusion 206 from load balancer 214. Intrusion detector 208 notifies intrusion manager 210 that machine 102b has received a likely intrusion. Response coordinator 212 instructs provisioning manger 216 to isolate machine 102b from the rest of server farm 100 by prohibiting any data communication between machine 102b and any other machine 102 in server farm 100, preferably in a manner that does not alert intrusion 206 or the hacker that sent intrusion 206 that machine 102b is being isolated. In a preferred embodiment of the present invention, this isolation is accomplished by allowing machine 102b to keep its identify, whether that identity be in the form of machine 102b's IP address, Media Access Control (MAC) address, or any other identifier of machine 102b.

Response coordinator then manipulates data accessible to machine 102b. Response coordinator 212 changes the data accessible to machine 102b, preferably in a manner that does not tip off the intrusion 206 or the hacker that sent intrusion 206 that data is being moved to reprovision machine 102b. Data being moved to be accessible to machine 102b comes from response database 214, which may be from SAN 122 or a local storage drive 128 from another machine 102, as shown and described in FIG. 1. The data being moved is non-sensitive data that the administrator or other authorized operator of server farm 100 does not wish to keep private. Preferably, such data is data that is non-critical data that is designed to be attractive to the hacker. In a preferred embodiment of the present invention, this attractive data is phony data designed to look like genuine sensitive data, such as payroll information, passwords, administrator security files, banking information, trade secrets and other information attractive to hackers. By reprovisioning machine 102b with such attractive data, the hacker is likely to remain connected to machine 102b for a long period of time, allowing the administrator of server farm 100 time to perform countermeasures, such as tracing the originating IP address of the intrusion 206, storing and/or studying the content of intrusion 206 and performing other forensic analysis of intrusion 206 according to techniques known to those skilled in the art of network security.

Figure 2B:
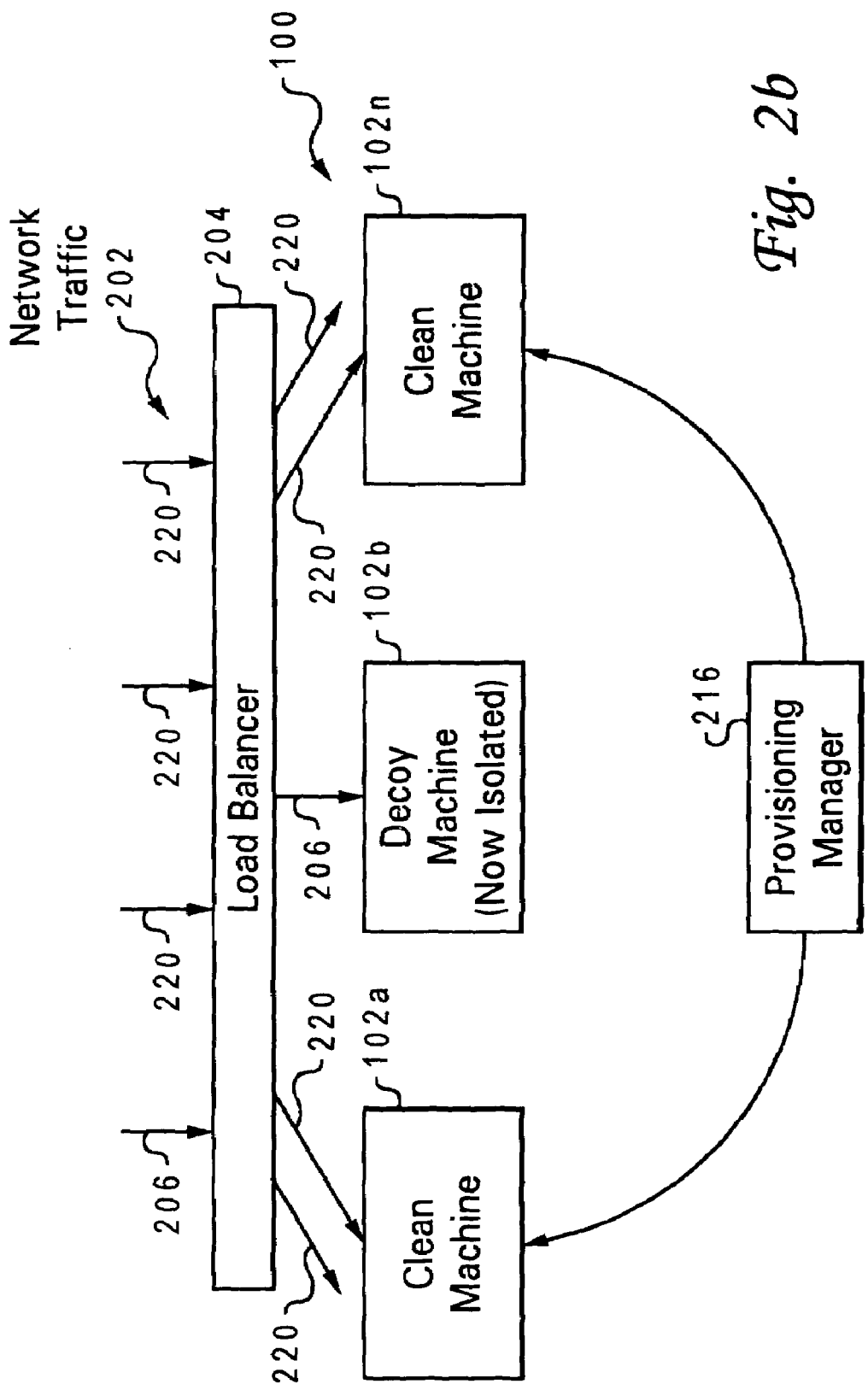

With reference now to FIG. 2b, there is depicted server farm 100 after machine 102b has been isolated and reprovisioned as a decoy machine. All packets received from the IP address that sent the original intrusion 206 are routed by load balancer 214 to machine 102b, as such packets are assumed to be additional intrusions 206. Other legitimate packets 220 of network traffic 202 are routed by load balancer 204 to clean machines 102a and 102n under the provisioning control of provision manager 216, which coordinates data communication and interaction between machine 102a and 102n. Thus, machine 102b has been dynamically reprovisioned as an isolated decoy machine.

Figure 3:
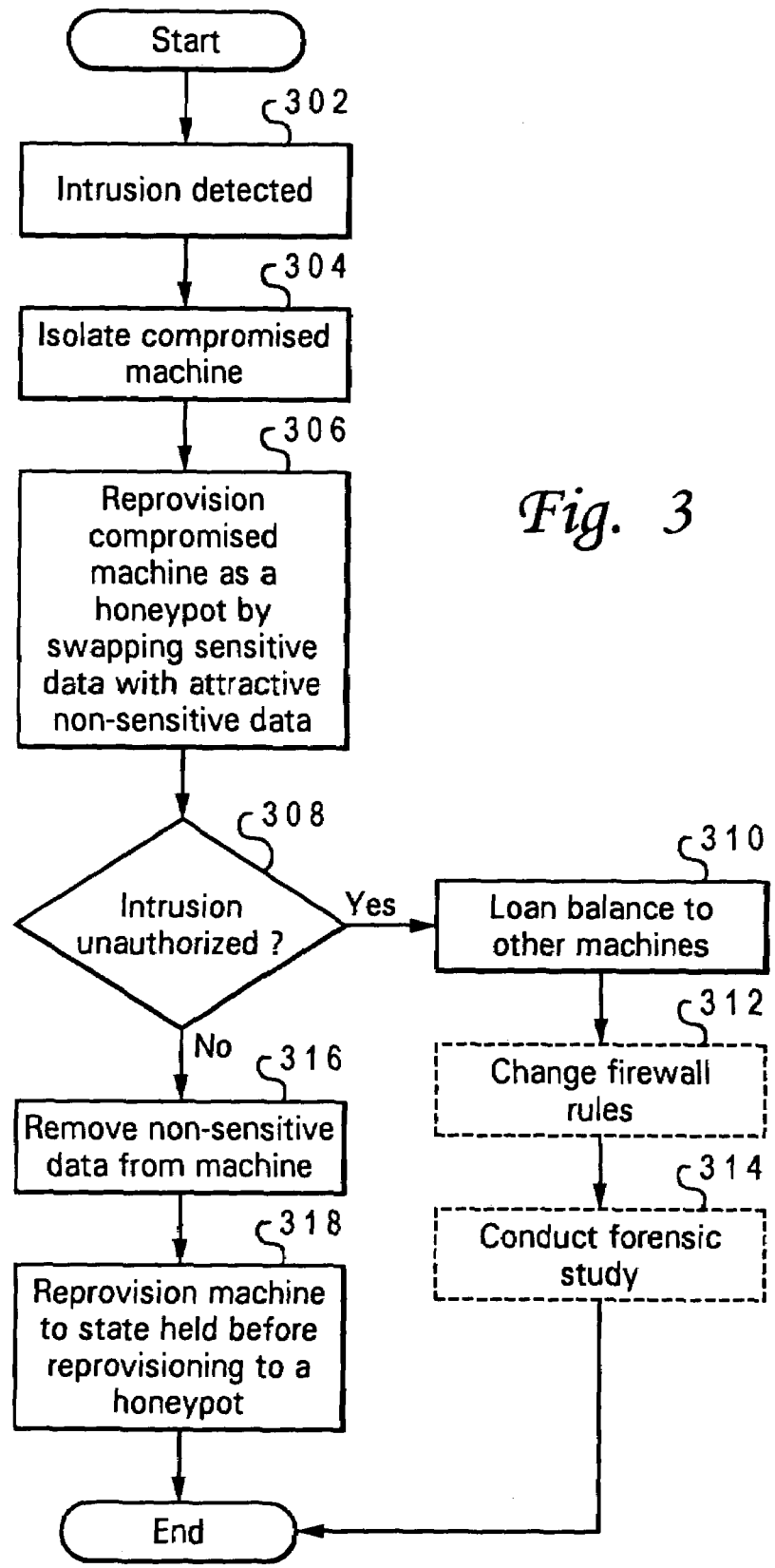
FIG. 3 is a flowchart of preferred steps taken in accordance with a preferred embodiment of the present invention.

Referring now to FIG. 3, there is depicted a flowchart of preferred steps taken in accordance with a preferred embodiment of the present invention. Once an intrusion is detected (block 302), the compromised machine that received the intrusion packet is isolated (block 304) from the rest of the server farm. The isolated machine is then reprovisioned (block 306), preferably as a honeypot, with non-sensitive, preferably ersatz, data that is attractive to a hacker. As depicted in decision block 308, further evaluation of the intrusion is then performed to determine if the intrusion is in fact an unauthorized intrusion. If the intrusion is unauthorized, it is presumed to be a malicious intrusion, and all incoming packets, other than those from the IP address of the source of the intrusion, are load balanced to other machines in the server farm (block 310). Optionally, firewall rules maybe changed (block 312) to prevent reception of any future packets from the IP address that sent the original intrusion. As a further option, a forensic study is performed (block 314) to study the nature of the intrusion, the intrusion's IP source, and any other aspects of the intrusion or its sender that a system administrator of the server farm can analyze.

If further analysis of the intrusion reveals that it in fact was not an unauthorized intrusion, then the non-sensitive data (including ersatz data) that was not accessible to the machine is removed (block 316), and the machine is reprovisioned to a state held before being reprovisioned as a honeypot (block 318). That is, the machine that received the packet that turned out to be authorized is returned to its original state in the server farm, being allowed to access all data that was originally authorized for that machine, and being capable of interacting with other machines in the server farm as before the suspected intrusion.

Note that response coordinator 212 may alternatively handle intrusion 206 with various schemes. For example, instead of reprovisioning the machine(s) 102 in server farm 100 as honeypot(s), response coordinator 212 could reprovision machine(s) 102 to various levels of "decoy-ness." That is, in order to avoid undue suspicion of an especially wary hacker, the intruded machine 102 can elect to allow machine 102 to remain partially connected to the rest of server farm 100, depending on how sensitive data accessible to the rest of server farm 100 is.

The present invention thus provides a method and system for converting an intruded machine into a decoy machine upon the intrusion. That is, the machine functions ordinarily doing real work until it receives an intrusion, and then is dynamically reprovisioned to become a decoy machine having access to fake or at least limited data for the intrusion to read. This dynamic reprovisioning permits effective use of resources, since the intruded machine is not reprovisioned as a decoy until the time of the intrusion, thus allowing the machine to do normal work until intruded upon. Further, by dynamically reprovisioning the intruded machine, there is less chance that the intruder will realize that the machine is a decoy, since the identity of the machine remains the same before and after the reprovisioning from a normal machine to a decoy.

Although aspects of the present invention have been described with respect to a data processing system and server farm, it should be understood that at least some aspects of the present invention may alternatively be implemented as a program product for use with a data storage system or computer system. Programs defining functions of the present invention can be delivered to a data storage system or computer system via a variety of signal-bearing media, which include, without limitation, non-writable storage media (e.g. CD-ROM), writable storage media (e.g. a floppy diskette, hard disk drive, read/write CD-ROM, optical media), and communication media, such as computer and telephone networks including Ethernet. It should be understood, therefore, that such signal-bearing media, when carrying or encoding computer readable instructions that direct method functions of the present invention, represent alternative embodiments of the present invention. Further, it is understood that the present invention may be implemented by a system having means in the form of hardware, software, or a combination of software and hardware as described herein or their equivalent.

While the invention has been particularly shown and described with reference to a preferred embodiment, it will be understood by those skilled in the art that various changes in form and detail may be made therein without departing from the spirit and scope of the invention. For example, although the invention has been described for a server farm having identical clone machines, the present invention may also be implemented with any collection of multiple data processing systems or processors, each data processing system or processor having the same or different hardware and/or software configurations.

What is claimed is:

1. A method for protecting a server farm from an intrusion, the server farm comprising multiple machines, the method comprising:
    detecting an intrusion by a machine in a server farm to which the intrusion has been sent;
    isolating the machine from the server farm;
    in response to detecting the intrusion by the machine, reprovisioning the machine as a decoy system having access to only non-sensitive data, such that in response to the machine detecting the intrusion the non-sensitive data is moved from an intrusion response database disposed external to the machine such that the non-sensitive data is accessible to the machine, and such that only the non-sensitive data is accessible to the intrusion in the machine;
    wherein the intrusion response database is disposed external to and communicatively coupled to the machine which received and detected the intrusion;
    wherein the intrusion is sent to the machine by a load balancer which initially receives the intrusion undetected as a normal packet of external network traffic and, based on load requirements of the multiple machines in the server farm, the load balancer sends the intrusion to the machine;
    in response to determining that the intrusion is a non-malicious intrusion, functionally reconnecting the machine to the server farm, and reprovisioning the reconnected machine to a state held before being reprovisioned as the decoy machine.

2. The method of claim 1, further comprising:
    retaining an identity of the machine after the intrusion.

3. The method of claim 2, wherein the identity is based on a network address of the machine.

4. The method of claim 1, wherein the server farm is coupled via an external network to a storage area network (SAN) having at least one storage device, wherein the intrusion response database which provides the non-sensitive data comprise the SAN.

5. The method of claim 4, wherein the external network is a fiber optic network.

6. The method of claim 1, wherein and wherein in response to an intrusion detector disposed within the machine detecting the intrusion, a response coordinator of the server farm is notified of the intrusion, which in turn instructs a provisioning manager of the server farm to reprovision the machine such that it has access only to the non-sensitive data from the intrusion response database.

7. The method of claim 1, wherein the intrusion response database is disposed within another machine in the server farm such that the another machine is connected to the machine which received and detected the intrusion.

8. The method of claim 1, further comprising:
    reallocating a process running on the machine before the intrusion to another machine in the server farm.

9. A server farm capable of self-protection from a malicious intrusion, the server farm comprising:
    a plurality of machines each including a plurality of processors and a computer storage medium such that each machine includes associated therewith computer instructions encoded on the computer storage medium that when executed by the machine provides:
    means for detecting an intrusion by a machine in the server farm to which the intrusion has been sent, wherein the intrusion is sent to the machine by a load balancer which initially receives the intrusion undetected as a normal racket of external network traffic and, based on load requirements of the plurality of machines in the server farm, the load balancer sends the intrusion to the machine;
    means for isolating the machine from the server farm;
    means for, in response to detecting the intrusion, reprovisioning the machine as a decoy system having access to only non-sensitive data, such that in response to the machine detecting the intrusion the non-sensitive data is moved from an intrusion response database disposed external to and communicatively coupled to the machine to be accessible to the machine, and such that only the non-sensitive data is accessible to the intrusion in the machine; and
    means for, in response to determining that the intrusion is a non-malicious intrusion, functionally reconnecting the machine to the server farm, and reprovisioning the reconnected machine to a state held before being reprovisioned as the decoy machine.

10. The server farm of claim 9, further comprising:
    means for retaining an identity of the machine after the intrusion.

11. The server farm of claim 10, wherein the identity is based on a network address of the machine.

12. The server farm of claim 9, wherein the server farm is coupled via an external network a storage area network (SAN) having at least one storage device, wherein the intrusion response database which provides the non-sensitive data comprises the SAN.

13. The server farm of claim 12, wherein the external network is a fiber optic network.

14. The server farm of claim 9, wherein a response coordinator of the server farm is notified of the intrusion, which in turn instructs a provisioning manager of the server farm to reprovision the machine such that it has access only to the non-sensitive data from the intrusion response database.

15. The server farm of claim 9, wherein the intrusion response database is disposed within another machine in the server farm such that the another machine is connected to the machine which received and detected the intrusion.

16. The server farm of claim 9, further comprising:
    means for reallocating a process running on the machine before the intrusion to another machine in the server farm.

17. A computer storage medium for protecting a server farm from an intrusion, the computer storage medium having encoded thereon computer instructions that when executed by a computer provides functionality, including:
    detecting an intrusion by a machine in a server farm to which the intrusion has been sent, wherein the intrusion is sent to the machine by a load balancer which initially receives the intrusion undetected as a normal packet of external network traffic and, based on load requirements of the plurality of machines in the server farm, the load balancer sends the intrusion to the machine;

isolating the machine from the server farm;

in response to detecting the intrusion, reprovisioning the machine as a decoy system having access to only non-sensitive data. such that in response to the machine detecting the intrusion the non-sensitive data is moved from an intrusion response database disposed external to and communicatively coupled to the machine such that the non-sensitive data is accessible to the machine, and such that only the non-sensitive data is accessible to the intrusion in the machine;

retaining an identity of the machine after the intrusion; and in response to determining that the intrusion is a non-malicious intrusion, functionally reconnecting the machine to the server farm, and reprovisioning the reconnected machine to a state held before being reprovisioned as the decoy machine.

* * * * *